(12) United States Patent
Nobiki

(10) Patent No.: US 10,108,765 B2
(45) Date of Patent: Oct. 23, 2018

(54) VOLTAGE DROP SIMULATION DEVICE AND VOLTAGE DROP SIMULATION METHOD

(71) Applicant: FUJITSU LIMITED, Kawasaki-shi, Kanagawa (JP)

(72) Inventor: Taku Nobiki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 4 days.

(21) Appl. No.: 15/344,897

(22) Filed: Nov. 7, 2016

(65) Prior Publication Data

US 2017/0154138 A1 Jun. 1, 2017

(30) Foreign Application Priority Data

Nov. 30, 2015 (JP) ................................. 2015-232624

(51) Int. Cl.
*G06F 17/50* (2006.01)

(52) U.S. Cl.
CPC ................................ *G06F 17/5009* (2013.01)

(58) Field of Classification Search
CPC ............. G06F 17/5009; G06F 17/5036; G06F 17/5045; G06F 17/5068; G06F 17/5072; G06F 17/5077; G06F 17/5081
USPC ................................. 716/109, 133, 136–137
See application file for complete search history.

(56) References Cited

U.S. PATENT DOCUMENTS

| 2004/0225487 | A1 | 11/2004 | Iwakura et al. |
| 2012/0054706 | A1 | 3/2012 | Kobayashi |
| 2014/0380262 | A1* | 12/2014 | Jang .................... G06F 17/5077 716/137 |
| 2015/0370944 | A1* | 12/2015 | Wang .................. G06F 17/5068 716/132 |
| 2017/0103146 | A1* | 4/2017 | Baumgartner ...... G06F 17/5009 |

FOREIGN PATENT DOCUMENTS

| JP | 2001-237412 | 8/2001 |
| JP | 2004-334654 | 11/2004 |
| JP | 2012-53651 | 3/2012 |

* cited by examiner

*Primary Examiner* — Paul Dinh
(74) *Attorney, Agent, or Firm* — Staas & Halsey LLP

(57) ABSTRACT

There is provided a voltage drop simulation device including: a memory; and a processor coupled to the memory and the processor configured to: divide a conductive body in which a current to be supplied from a power source to elements arranged on a PCB flows into a plurality of meshes including at least one mesh whose size is different from other meshes, calculate voltage values of a plurality of measurement points set in the plurality of meshes, respectively, and calculate a voltage drop of each of the plurality of meshes by dividing, for each of the plurality of meshes treated as a target mesh, a difference between voltage values of a first measurement point included in the target mesh and a second measurement point included in an adjacent mesh that is adjacent to the target mesh by a distance between the first and second measurement points.

15 Claims, 10 Drawing Sheets

FIG. 11

| ANALYSIS RESULT LIST | | | | | | | |
|---|---|---|---|---|---|---|---|
| VOLTAGES | VOLTAGE DROPS | CURRENTS | CURRENT DENSITIES | PEAK CURRENTS (DENSITIES) | PEAK RESULTS OF ANALYSIS | | |

SELECT TARGET: ▶
NUMBER OF NODES TO BE DISPLAYED: 100
SELECT LAYER: L1(H1) ▶ TO L1(H1) ▶   SELECT SINGLE LAYER
SEARCH NET: SPECIFIED NET ▶   SEARCH NEXT
SEARCH KEYWORD:

| No | NODE NAME | LAYER | X COORDINATE | Y COORDINATE | VOLTAGE DROP |
|---|---|---|---|---|---|
| 0 | F001_2 | 1 | 21379 | 18456 | 1.6760E-001 |
| 1 | H1_79900_9400 | 1 | 79900 | 9400 | 3.7975E-001 |
| 2 | H1_84600_9400 | 1 | 84600 | 9400 | 2.9787E-002 |
| 3 | H1_28200_14100 | 1 | 28200 | 14100 | 6.1691E-002 |
| 4 | H1_79900_14100 | 1 | 79900 | 14100 | 2.8090E-002 |
| 5 | H1_84600_14100 | 1 | 84600 | 14100 | 2.9787E-002 |
| 6 | H1_23500_18800 | 1 | 23500 | 18800 | 6.1691E-002 |
| 7 | H1_28200_18800 | 1 | 28200 | 18800 | 4.6809E-002 |

CSV   MEASURE DIFFERENCE IN POTENTIAL   ☑ CHANGE SCREEN UPON SELECTION   CLOSE

VOLTAGE DROP SIMULATION DEVICE AND VOLTAGE DROP SIMULATION METHOD

CROSS-REFERENCE TO RELATED APPLICATION

This application is based upon and claims the benefit of priority of the prior Japanese Patent Application No. 2015-232624, filed on Nov. 30, 2015, the entire contents of which are incorporated herein by reference.

FIELD

The embodiment discussed herein is related to a voltage drop simulation device and a voltage drop simulation method.

BACKGROUND

In the design of a power source for a printed circuit board (PCB), simulation is executed to confirm whether or not a sufficient voltage is supplied to an integrated circuit (IC). In the simulation, a conductive body of the PCB is divided into meshes, voltages to be supplied to the meshes are calculated, and a voltage distribution between the power source and the IC is calculated. Whether or not a problem with the voltage to be supplied exists is confirmed in advance. If the voltage to be supplied to the IC is lower than a voltage stated in specifications of the IC, measures are taken for a portion of which a voltage drop is large.

In order to calculate voltage drops of portions of the PCB, differences in potential between adjacent meshes are calculated and portions between which the difference in potential is large is presented based on the calculated values.

In the simulation, if the whole PCB is divided into small meshes, a time period for analysis and the amount of a memory to be used increase. Thus, there is a technique for reducing the time period for the analysis and the amount of the memory to be used by using non-uniform meshes obtained by reducing the sizes of only meshes to be used.

A power source noise model generating device that models a power layer using non-uniform meshes is known (refer to, for example, Japanese Laid-open Patent Publication No. 2004-334654).

Other examples of related art are Japanese Laid-open Patent Publications Nos. 2012-53651 and 2001-237412.

SUMMARY

According to an aspect of the invention, a voltage drop simulation device configured to calculate voltage drops of a conductive body in which a current to be supplied from a power source to elements arranged on a printed circuit board flows, the voltage drop simulation device includes: a memory; and a processor coupled to the memory and the processor configured to: divide the conductive body into a plurality of meshes including at least one mesh whose size is different from other meshes, calculate voltage values of a plurality of measurement points set in the plurality of meshes, respectively, and calculate a voltage drop of each of the plurality of meshes by dividing, for each of the plurality of meshes treated as a target mesh of which the voltage drop is to be calculated, a difference between a voltage value of a first measurement point included in the target mesh and a voltage value of a second measurement point included in an adjacent mesh that is adjacent to the target mesh by a distance between the first measurement point and the second measurement point, wherein the first measurement point and the second measurement point are included in the plurality of measurement points.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a diagram illustrating an example of display using a list of voltage drops.

DESCRIPTION OF EMBODIMENT

If meshes into which a whole PCB is divided are not uniform, wirings are thin (or have high resistance), and gaps between the meshes are narrow, differences in potential between the meshes are small. If the meshes are not uniform, the wirings are thick (or have low resistance), and the gaps between the meshes are wide, the differences in potential between the meshes are large. It is, therefore, difficult to compare the differences in potential and determine a portion of which a voltage drop is large. Since the sizes of the non-uniform meshes are different, it is difficult to identify a portion of which a voltage drop is large by the comparison of differences in potential between adjacent meshes.

Hereinafter, an embodiment of a technique for identifying a portion of which a voltage drop is large in a case where a conductive body that is a wiring of a PCB is divided into non-uniform meshes is described with reference to the accompanying drawings.

Figure 1:
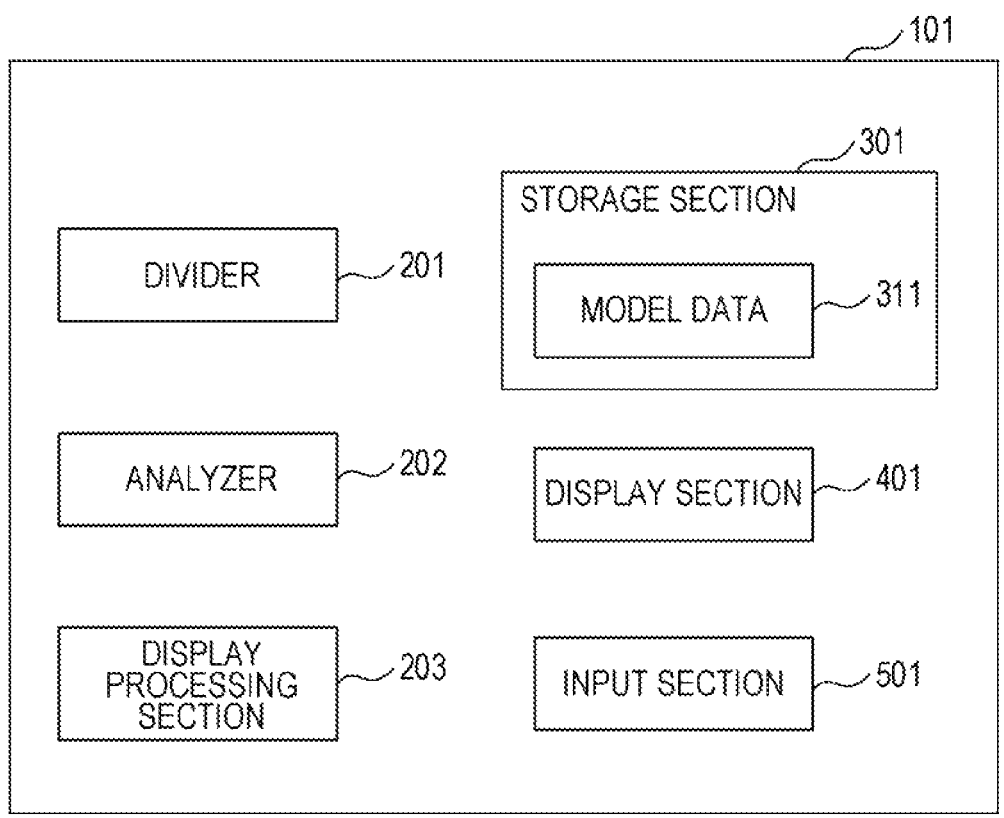
FIG. 1 is a configuration diagram illustrating a voltage drop simulation device according to an embodiment.

FIG. 1 is a configuration diagram illustrating a voltage drop simulation device according to the embodiment. The voltage drop simulation device 101 includes a divider 201, an analyzer 202, a display processing section 203, a storage section 301, and a display section 401. The voltage drop simulation device 101 is, for example, a server or a personal computer (PC).

The divider 201 reads model data 311 and divides a wiring pattern or a conductive body in which a current to be supplied from a power source to elements flows into non-uniform meshes or regions whose sizes are different. In other words, the size of at least one mesh among the multiple divided meshes is different from the sizes of the other multiple divided meshes. The sizes of at least two of multiple divided meshes may be the same. The sizes of all the meshes may be different from each other.

The analyzer 202 uses a requirement input from an input section 501 to execute analysis by executing simulation. The analyzer 202 calculates voltage drops of the meshes. The analyzer 202 is an example of a calculator.

The display processing section 203 displays information such as analysis results on the display section 401. The storage section 301 stores a program and data that are used in the voltage drop simulation device 101. The storage section 301 stores the model data 311.

The model data 311 is data of the PCB and includes the wiring pattern to be analyzed. The model data 311 includes information such as types and characteristics of elements (for example, an IC, a power source, and the like) included in the PCB, the positions of the elements, the position, shape, and connection relationships of the wiring pattern (including vias) to be used to supply power between the power source and the elements, the position, shape, and connection relationships of a wiring pattern to be used for transmission of signals between the elements, and the structure (the number of layers and the thicknesses and sizes of the layers) of the PCB. Each of the wiring patterns is an example of a conductive body. Power (current) is supplied by the power source to the elements via the wiring pattern that connects the power source to the elements and is used to supply power. The wiring patterns are, for example, power source plates or copper foils.

The display section 401 is a display device that displays information such as the analysis results. The input section 501 inputs an instruction and information (for example, the requirement for the simulation) from a user to the divider 201, the analyzer 202, and the display processing section 203.

Figure 2:
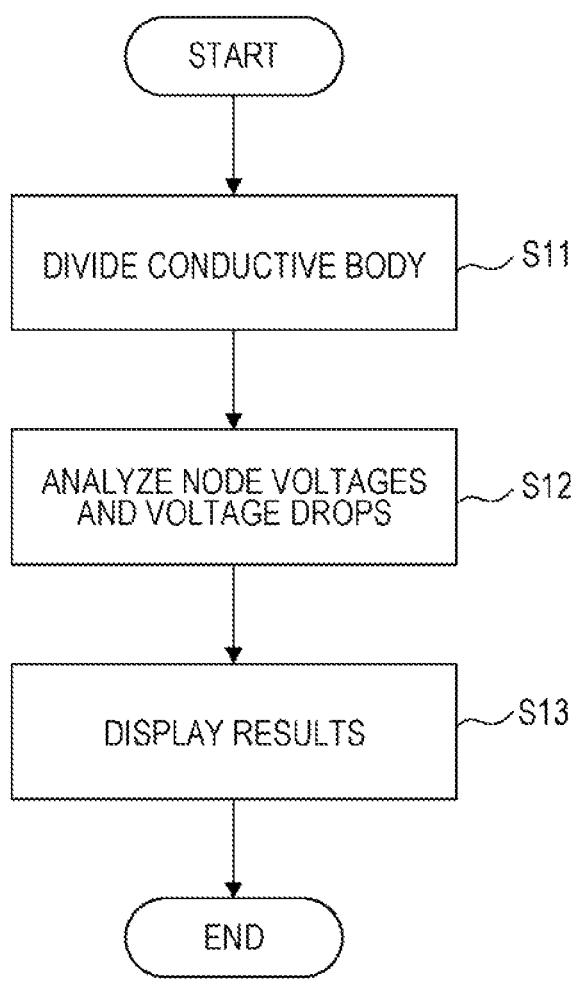
FIG. 2 is a flowchart of a simulation process according to the embodiment.

FIG. 2 is a flowchart of a simulation process according to the embodiment. In operation S11, the divider 201 reads the model data 311 from the storage section and divides, into the multiple non-uniform meshes, the wiring pattern (conductive body) included in the model body 311 and to be analyzed and used to supply power between the power source and the elements. If multiple wiring patterns exist, the voltage drop simulation device 101 divides, into meshes, a wiring pattern selected by the user via the input section 501 from among the multiple wiring patterns and executes the following operations S12 and S13 on the divided meshes. Alternatively, the voltage drop simulation device 101 may divide all the wiring patterns into meshes and execute the following operations S12 and S13 on the divided meshes.

In operation S12, the analyzer 202 receives the requirement for the simulation from the input section 501, executes the simulation using the requirement, calculates voltage values of nodes of the meshes and voltage drops between adjacent meshes, and calculates voltage drops of the meshes. The analyzer 202 calculates voltage drops of at least two meshes among the multiple meshes. It is preferable that the analyzer 202 calculate voltage drops of all the meshes. The requirement for the simulation is, for example, the values of voltages to be input to the wiring pattern from the power source, the values of currents to be supplied to elements connected to the wiring pattern, and the like. The nodes are locations representatively indicating the voltage values of the meshes. Each node is set in a respective mesh in operation S11.

In operation S13, the display processing section 203 displays a diagram based on the calculated voltage values and the calculated voltage drops or a list of the voltage drops on the display section 401. An example of the display by the display processing section 203 is described later.

Figure 3:
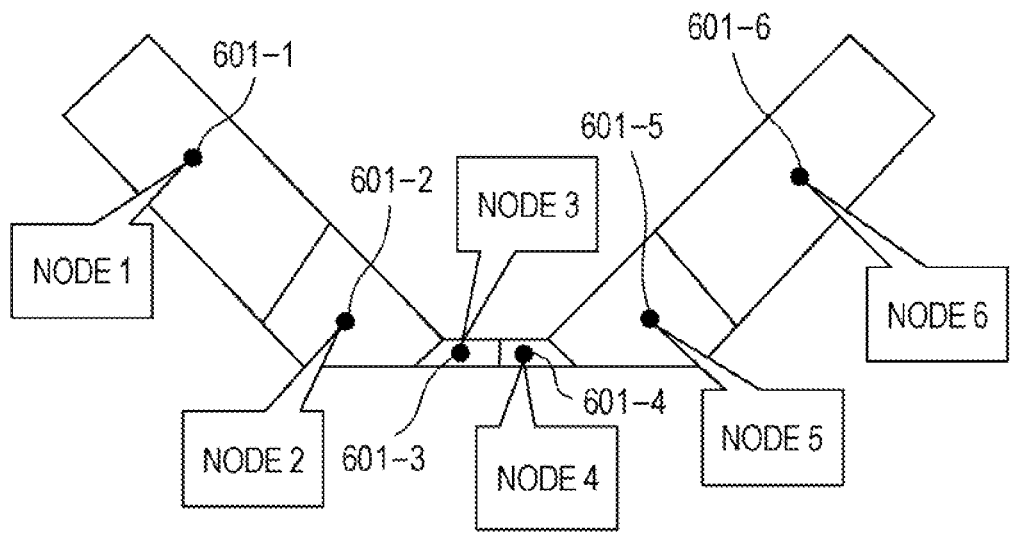
FIG. 3 is a diagram describing a method of calculating voltage drops of meshes according to the embodiment.

Next, a method of calculating the voltage drops of the meshes according to the embodiment is described. FIG. 3 is a diagram describing the method of calculating the voltage drops of the meshes according to the embodiment.

In FIG. 3, the wiring pattern to be analyzed is divided into 6 non-uniform meshes, and nodes $601\text{-}i$ ($i=1$ to 6) are set in the meshes, respectively. The nodes are measurement points at which voltages of the meshes including the nodes are measured. The nodes are locations representatively indicating the voltage values of the meshes. In FIG. 3, the nodes are indicated as points. The nodes $601\text{-}i$ are represented as nodes i in some cases. The node 601-1 is connected to a power supply circuit (not illustrated). The node 601-6 is connected to a power supply input terminal of an IC (not illustrated). In the simulation, power is supplied from the power supply circuit to the IC via the wiring pattern, and the voltage values of the nodes $601\text{-}i$ are calculated. It is assumed that the voltage values of the nodes $601\text{-}i$ are already calculated and the positions (coordinates) of the nodes $601\text{-}i$ are able to be acquired from the model data 311 in the simulation.

In the embodiment, a voltage drop between adjacent meshes is the absolute value of a value obtained by dividing the difference between voltage values of nodes of the adjacent meshes by the distance between the nodes of the adjacent meshes.

A case where a voltage drop of a node 2 is calculated is described below. In the embodiment, a voltage drop (voltage drop 2-1) between the node 2 and a node 1 is calculated according to the following equation.

The voltage drop 2-1=|(the voltage value of the node 2−the voltage value of the node 1)/the distance between the node 2 and the node 1|

In the embodiment, a voltage drop (voltage drop 2-3) between the node 2 and a node 3 is calculated according to the following equation.

The voltage drop 2-3=|(the voltage value of the node 2−the voltage value of the node 3)/the distance between the node 2 and the node 3|

In the embodiment, a larger one of the voltage drops 2-1 and 2-3 is treated as the voltage drop of the node 2. In the embodiment, voltage drops of the nodes i are represented as voltage drops of the meshes including the nodes i in some cases. In the same manner as described above, the analyzer 202 calculates voltage drops of the nodes 601-1 and 601-3 to 601-6.

The voltage drops of the multiple nodes (multiple meshes) are calculated in the aforementioned manner. Thus, even if the non-uniform meshes are used, the voltage drops may be compared and a portion (mesh) of which a voltage drop is large may be identified.

Next, results obtained using a conventional method of calculating voltage drops and results obtained using the method of calculating voltage drops according to the embodiment are described.

Figure 4:
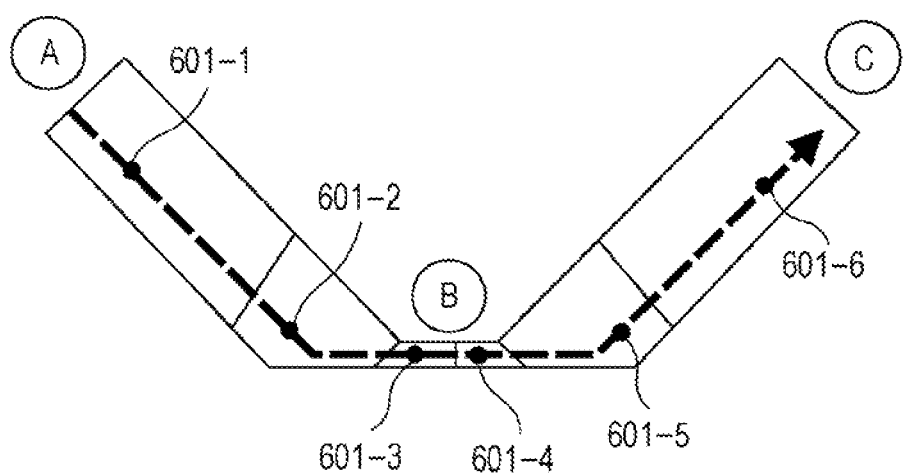
FIG. 4 is a diagram illustrating divided non-uniform meshes to be analyzed.

FIG. 4 is a diagram illustrating divided non-uniform meshes to be analyzed. In FIG. 4, characteristics (voltage drops) of differences in potential between the meshes (or nodes) existing on a line A-B-C extending from A through B to C are calculated.

Figure 5:
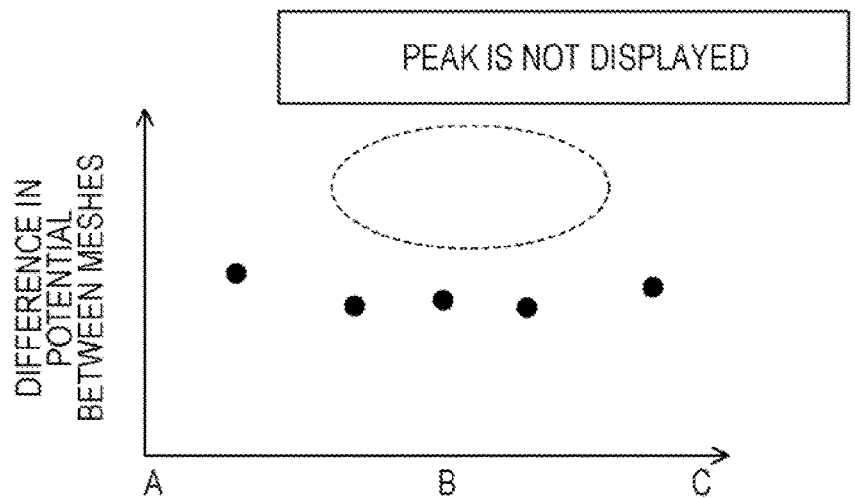
FIG. 5 is a diagram illustrating voltage drops of meshes that are calculated using a conventional method of calculating voltage drops.

FIG. 5 is a diagram illustrating voltage drops between the meshes that are calculated using the conventional method of calculating voltage drops. In FIG. 5, the ordinate indicates the difference in potential between meshes (or the differences in potential between nodes), and the abscissa indicates a position on the line A-B-C. As illustrated in FIG. 5, according to the conventional method of calculating voltage drops, a peak voltage drop does not appear and it is difficult to identify a portion of which a voltage drop is large.

Figure 6:
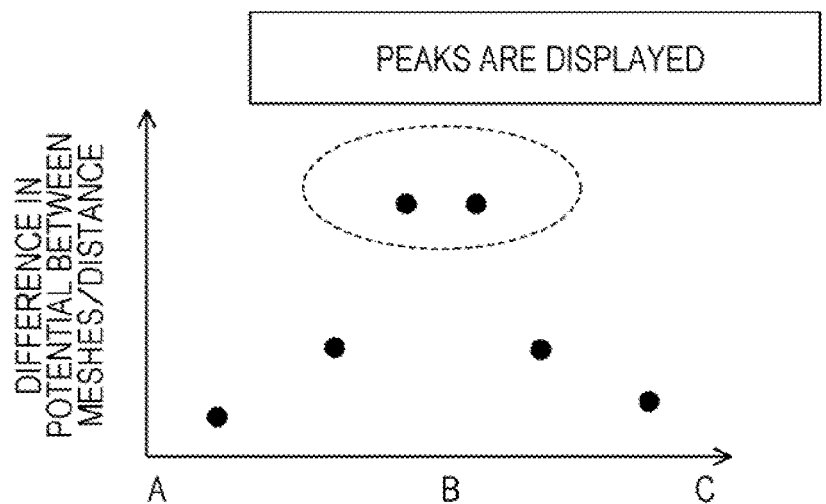
FIG. 6 is a diagram illustrating voltage drops of meshes that are calculated using the method of calculating voltage drops of meshes according to the embodiment.

FIG. 6 is a diagram illustrating voltage drops between the meshes that are calculated using the method of calculating voltage drops according to the embodiment. In FIG. 6, the ordinate indicates the difference in potential between meshes/the distance between nodes included in the meshes (or indicates a value obtained by dividing the difference in potential between the nodes by the distance between the nodes), and the abscissa indicates a position on the line A-B-C. In FIG. 6, for each of the nodes, the maximum value among calculated voltage drops between the target node and nodes included in meshes and adjacent to the target node is treated as a voltage drop of a mesh including the target node, and the voltage drop is plotted on a graph. As illustrated in FIG. 6, according to the method of calculating voltage drops according to the embodiment, a difference (voltage drop) in potential per unit length is calculated, peak voltage drops are displayed, and portions of which the voltage drops are large may be easily identified. In addition, since the non-uniform meshes are used, a time period for the analysis and the amount of a memory to be used may be reduced, compared with a case where uniform meshes are used.

Another method of calculating voltage drops in a case where a certain mesh is adjacent to multiple meshes is described below.

Figure 7:
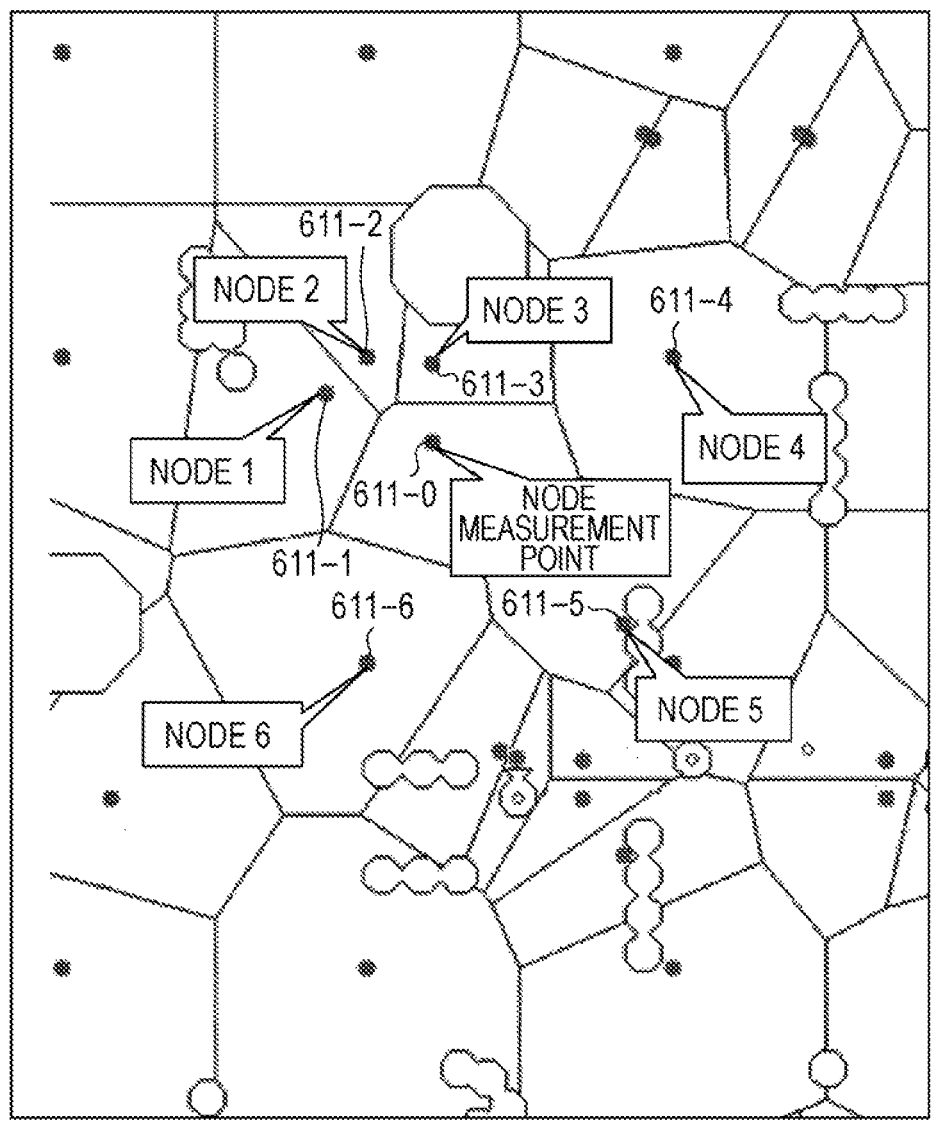
FIG. 7 is a diagram describing another method of calculating voltage drops of meshes according to the embodiment.

FIG. 7 is a diagram describing the method of calculating voltage drops according to the embodiment. A case where a voltage drop of a target mesh including a node 611-0 is calculated is described below. The node 611-0 is represented as a node observation point in some cases.

In FIG. 7, the target mesh including the node 611-0 is adjacent to six meshes that include nodes 611-$i$ ($i$=1 to 6), respectively. In the embodiment, a voltage drop of the target mesh including the node 611-0 is the maximum value among voltage drops between the target mesh including the node 611-0 and the meshes adjacent to the target mesh and including the nodes 611-$i$. Specifically, the voltage drops between the node 611-0 and the nodes 611-$i$ are calculated and the maximum value among the calculated voltage drops is treated as the voltage drop of the target mesh including the node 611-0.

Specifically, the analyzer 202 calculates a voltage drop 0-1 between the node 611-0 and the node 611-1 using the following equation in the same manner as the calculation described with reference to FIG. 3.

> The voltage drop 0-1=|(the voltage value of the node 611-0)−(the voltage value of the node 611-1)/ the distance between the node 611-0 and the node 611-1|

In the same manner as described above, the analyzer 202 calculates voltage drops 0-2 to 0-6 between the node 611-0 and the nodes 611-2 to 611-6. Then, the analyzer 202 treats the maximum value among the calculated voltage drops 0-1 to 0-6 as the voltage drop of the node 611-0 or the voltage drop of the mesh including the node 611-0.

Figure 8:
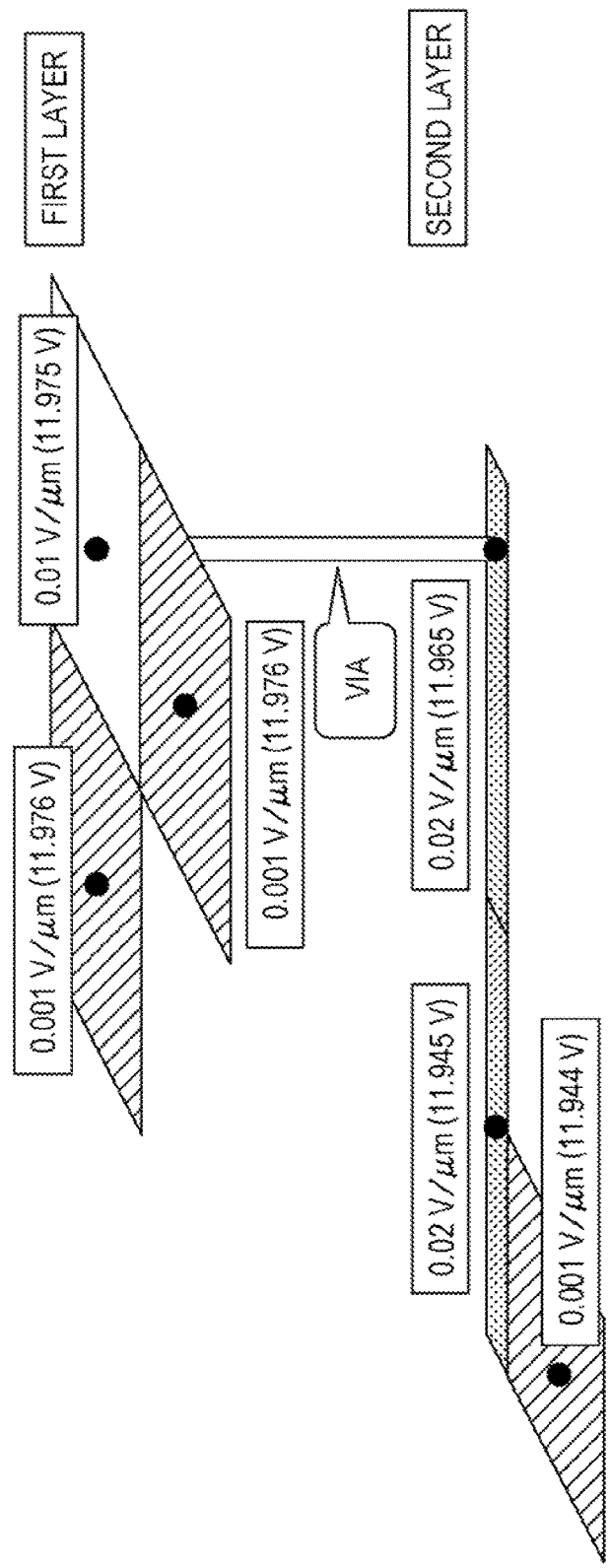
FIG. 8 is a diagram illustrating nodes connected to each other through a via.

Next, a case where nodes located in different layers are connected to each other through a via is described. FIG. 8 is a diagram illustrating the nodes connected to each other through the via.

In FIG. 8, meshes that include nodes 621-1 to 621-3 are located in a first layer of the PCB, and meshes that include nodes 622-1 to 622-3 are located in a second layer of the PCB. The mesh including the node 621-1 is adjacent to the meshes including the nodes 621-2 and 621-3. In addition, the mesh including the node 622-1 is adjacent to the mesh including the node 622-2, and the mesh including the node 622-2 is adjacent to the mesh including the node 622-3. The nodes 621-1 and 622-1 are connected to each other through the via. In other words, the mesh including the node 621-1 and the mesh including the node 622-1 are connected to each other through the via.

In the embodiment, a voltage drop between the meshes connected to each other through the via is the absolute value of a value obtained by dividing the difference between voltage values of the nodes of the meshes connected to each other through the via by the distance (layer thickness) between the nodes of the meshes connected to each other through the via. Specifically, the layer thickness (or the distance between the two layers in which the meshes connected to each other through the via exist) of the PCB is treated as the distance between the nodes, and the voltage drop is calculated in the same manner as the calculation described with reference to FIGS. 3 and 7.

As described with reference to FIG. 7, in the embodiment, in order to calculate a voltage drop of a certain mesh, voltage drops between a node of the certain mesh and nodes of all meshes adjacent to the certain mesh and located in the same layer as the certain mesh in the PCB are compared with each other, and the maximum voltage drop among the compared voltage drops is used as the voltage drop of the certain mesh.

In the embodiment, meshes connected to each other through vias are treated as adjacent meshes, and voltage drops between nodes included in the meshes connected to each other through the vias are calculated. Specifically, if a target mesh including a target node of which a voltage drop is to be calculated is connected to a mesh including another node through a via, not only voltage drops between the target node of the target mesh and nodes of all meshes adjacent to the target mesh and located in the same layer as the target mesh in the PCB, but also a voltage drop between the target node of the target mesh and the other node of the mesh connected to the target mesh through the via, are compared with each other. The maximum value among the voltage drops between the target node of the target mesh and the nodes of all the meshes adjacent to the target mesh and located in the same layer as the target mesh in the PCB and the voltage drop between the target node of the target mesh and the other node of the mesh connected to the target mesh through the via is treated as the voltage drop of the target mesh including the target node. In FIG. 8, calculated voltage values of the nodes 621-1 to 621-3 and 622-1 and 622-3 and calculated voltage drops of the nodes 621-1 to 621-3 and 622-1 and 622-3 are indicated. In FIG. 8, the layer thickness and the distances between the nodes are 1 micrometer (μm). For example, the voltage value of the node 621-1 is 11.975 volts (V) and the voltage drop of the mesh including the node 621-1 is 0.01 V/μm.

By calculating the voltage drop using the layer thickness of the PCB as the distance between the nodes in the aforementioned manner, the voltage drop between the meshes connected to each other through the via may be analyzed.

Next, details of the display (operation S13) of the results are described. Traditionally, a calculated voltage drop is represented using the color of a line connecting nodes to each other. In this case, it is difficult to visually recognize the degree of the voltage drop. In the embodiment, however, colors that correspond to the voltage values or the values of the voltage drops are applied to the meshes and displayed. Thus, the degrees of the voltage drops are clearly recognized, compared with the conventional technique. By using this display method, a pattern diagram including a voltage drop between meshes connected to each other through a via may be displayed.

Figure 9:
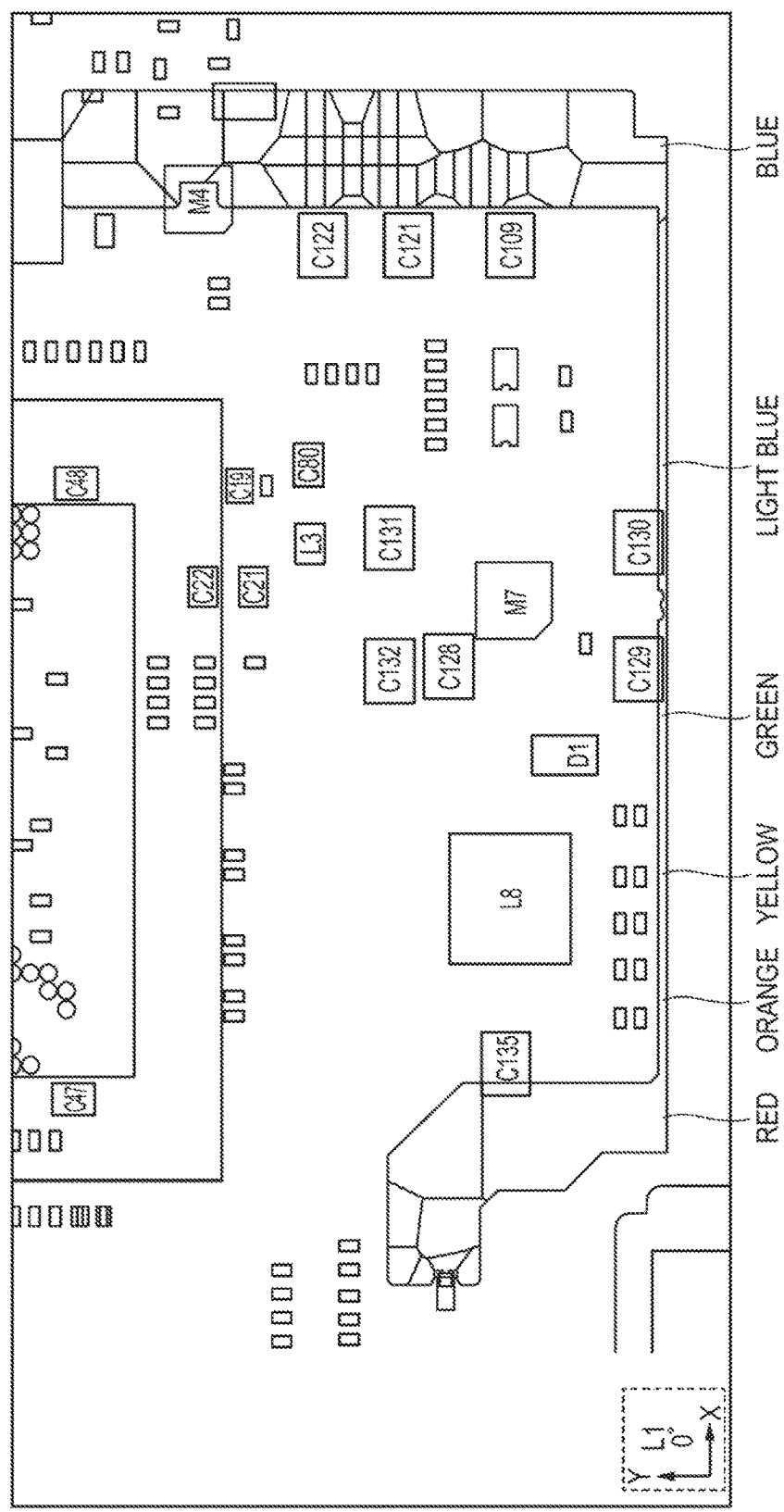
FIG. 9 is a diagram illustrating an example of display of a voltage distribution.

FIG. 9 is a diagram illustrating an example of display of a voltage distribution. In the example illustrated in FIG. 9, a voltage distribution of one wiring pattern among multiple wiring patterns to be used to supply a current from the power supply circuit (not illustrated) to the IC (not illustrated) is displayed. Although colors are not displayed in FIG. 9, the display processing section 203 displays meshes with colors corresponding to voltage values of nodes. The voltage values are potentials with respect to a certain standard point (for example, a standard point of the power source). A mesh including a node of which a voltage value is high is displayed in red, and a mesh including a node of which a voltage value is low is displayed in blue. Specifically, a voltage value of a node of a mesh displayed in color is lower in order of red, orange, yellow, green, light blue, and blue.

Figure 10:
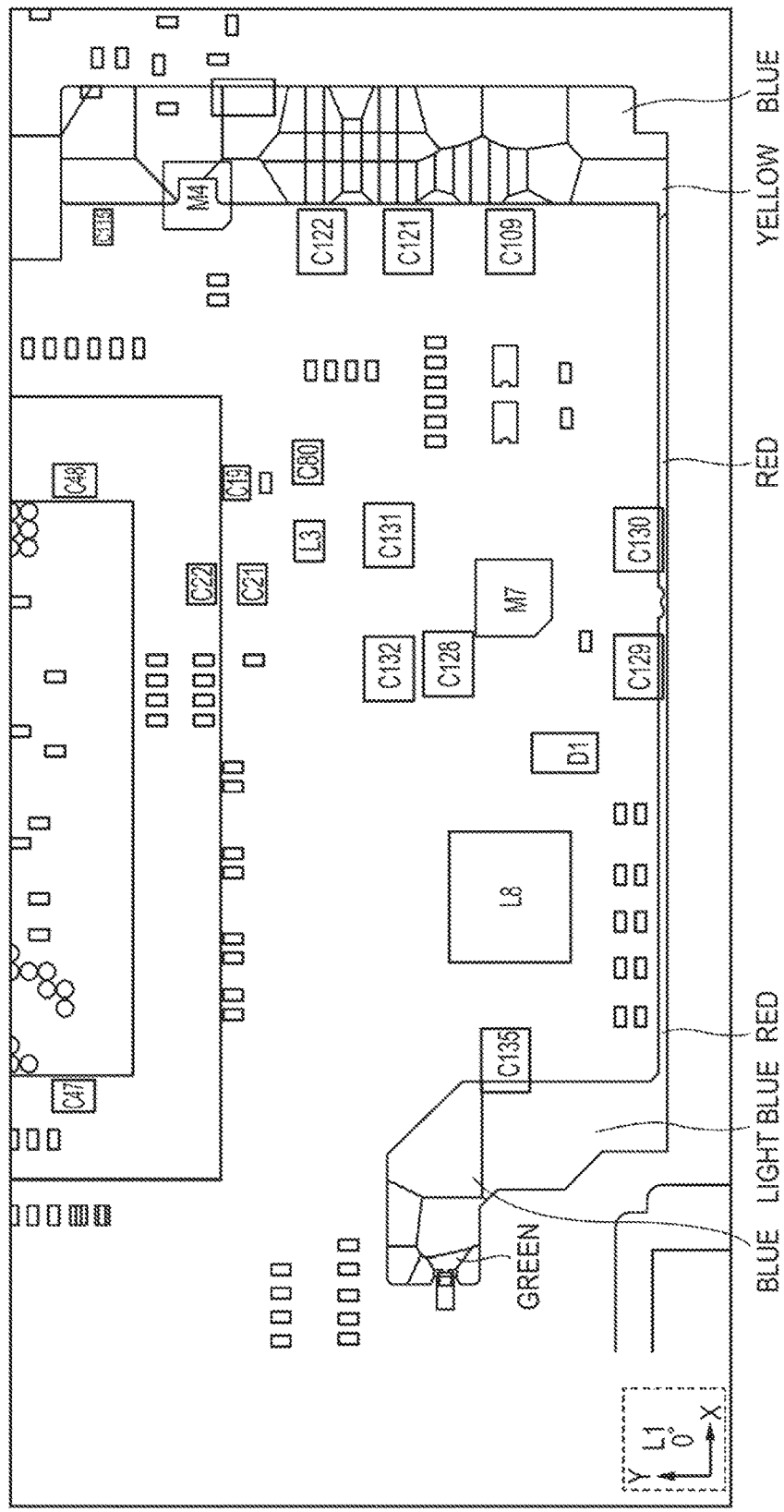
FIG. 10 is a diagram illustrating an example of display of voltage drops.

FIG. 10 is a diagram illustrating an example of display of voltage drops. In FIG. 10, voltage drops of one wiring pattern among the multiple wiring patterns to be used to supply the current from the power source to the IC are displayed. Although colors are not displayed in FIG. 10, the display processing section 203 displays meshes with colors corresponding to calculated voltage drops of nodes of the meshes. A mesh of which a voltage drop is large is displayed in red, and a mesh of which a voltage drop is small is displayed in blue. Specifically, a voltage drop of a mesh displayed in color is smaller in order of red, orange, yellow, green, light blue, and blue. Since the meshes are displayed with the colors corresponding to voltage drops of the meshes, the user may easily recognize a portion of which a voltage drop is large. In addition, the display processing section 203 may display maximum voltage drops of nodes using a list.

FIG. 11 illustrates an example of the display using the list of the voltage drops. As illustrated in FIG. 11, the display processing section 203 displays the list of the maximum voltage drops (or the maximum value among differences in potential between each node and nodes adjacent to the node) of the nodes. In entries of the list, numbers (No) assigned to the nodes, node names indicating the names of the nodes, the positions (layer, X coordinate, and Y coordinate) of the nodes, and the maximum voltage drops of the nodes are displayed. For example, in FIG. 11, an entry displayed in the first row of the list indicates that a node with a node name "F001_02" is located in the first layer of the PCB at a position defined by an X coordinate 21379 (horizontal position) and a Y coordinate 18456 (vertical position) and that a voltage of the node with the node name "F001_02" is 1.670E-002 (=0.167) V/μm.

The list may be sorted in descending order of voltage drop. When an entry is specified, a node indicated in the specified entry may be identified on a map illustrated in FIG. 10. By linking the list illustrated in FIG. 11 with the voltage drop display illustrated in FIG. 10, a portion of which a voltage drop is large may be easily identified.

According to the voltage drop simulation device according to the embodiment, when a wiring pattern is divided into non-uniform meshes, voltage drops of the meshes are easily compared with each other, and a portion of which a voltage drop is large may be identified. In addition, according to the voltage drop simulation device according to the embodiment, a time period for the analysis and the amount of a memory to be used may be reduced by using the non-uniform meshes.

Figure 12:
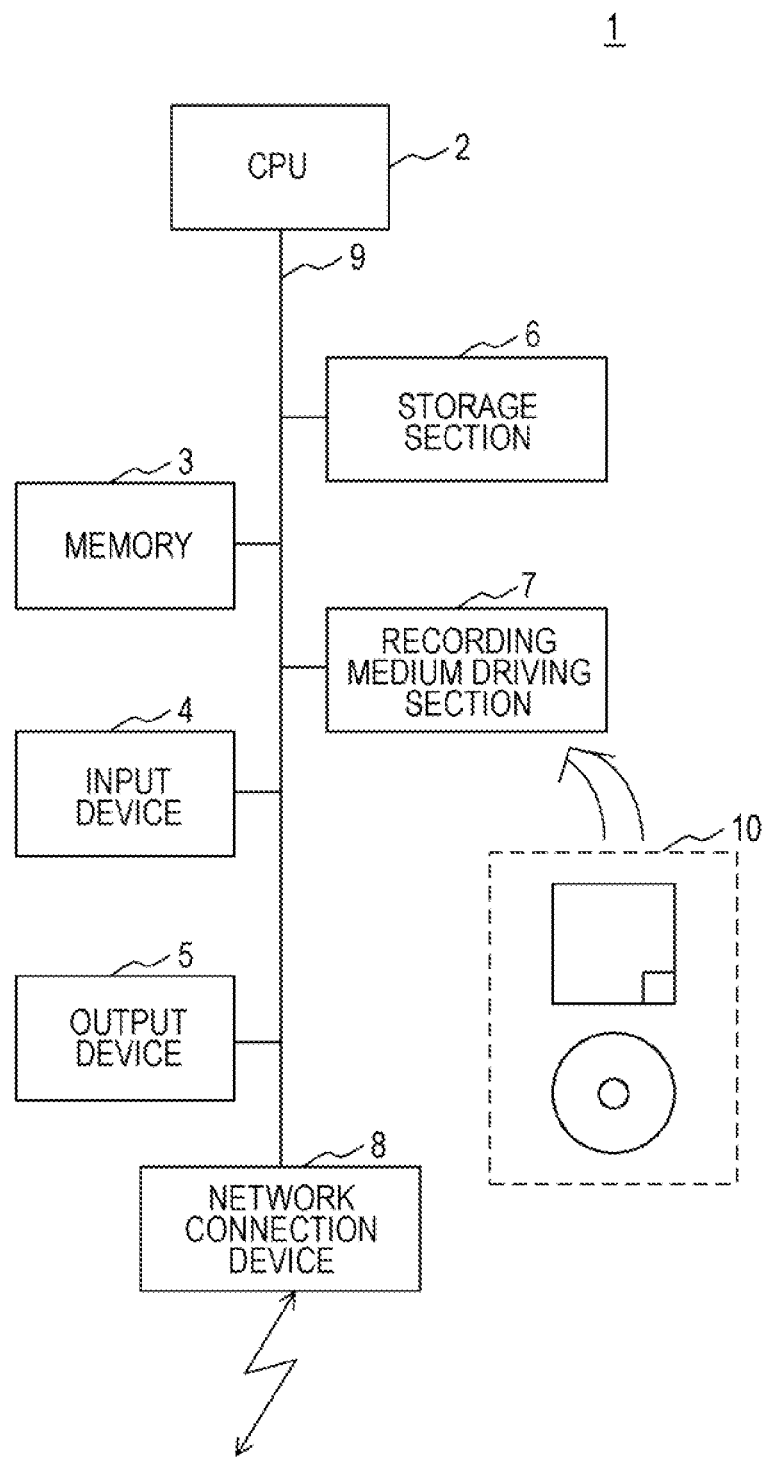
FIG. 12 is a configuration diagram illustrating a voltage drop simulation device (computer).

FIG. 12 is a configuration diagram illustrating a voltage drop simulation device (computer). The voltage drop simulation device 101 according to the embodiment may be achieved by the voltage drop simulation device (computer) 1 illustrated in FIG. 12.

The voltage drop simulation device 1 includes a CPU 2, a memory 3, an input device 4, an output device 5, a storage section 6, a recording medium driving section 7, and a network connecting section 8. The CPU 2, the memory 3, the input device 4, the output device 5, the storage section 6, the recording medium driving section 7, and the network connecting section 8 are connected to each other by a bus 9.

The CPU 2 is a central processing unit that controls the whole voltage drop simulation device 1. The CPU 2 operates as the divider 201, the analyzer 202, and the display processing section 203.

The memory 3 is a read only memory (ROM), a random access memory (RAM), or the like and temporarily stores the program stored in the storage section 6 (or a portable recording medium 10) or the data stored in the storage section 6 (or a portable recording medium 10). The CPU 2 executes the aforementioned various processes by executing the program using the memory 3.

In this case, program codes read from the portable recording medium 10 or the like achieve the functions described in the embodiment.

The input device 4 is, for example, a keyboard, a mouse, a touch panel, a camera, a sensor, or the like and is used to input an instruction or information from the user or an operator, acquire data to be used in the voltage drop simulation device 1, and the like. The input device 4 corresponds to the input section 401.

The output device 5 is, for example, a display, a printer, or the like. The output device 5 operates under control by the CPU 2 and outputs the results of the processes and an inquiry to the user or the operator. The output device 5 corresponds to the display section 401.

The storage section 6 is, for example, a magnetic disk device, an optical disc device, a tape device, or the like. The voltage drop simulation device 1 stores the aforementioned program and the aforementioned data in the storage section 6, reads the program and the data into the memory 3, and uses the program and the data. The memory 3 and the storage section 6 correspond to the storage section 301.

The recording medium driving section 7 drives the portable recording medium 10 and accesses details recorded in the portable recording medium 10. As the portable recording medium, an arbitrary computer-readable recording medium such as a memory card, a flexible disk, a compact disc-read only memory (CD-ROM), an optical disc, or a magneto-optical disc is used. The user stores the aforementioned program and the aforementioned data in the portable recording medium, reads the program and the data into the memory 3, and uses the program and the data.

The network connection device 8 is a communication interface connected to an arbitrary communication network such as a local area network (LAN) or a wide area network (WAN) and configured to execute data conversion for communication. The network connection device 8 transmits data to a device connected to the voltage drop simulation device 1 via the communication network and receives data from the device connected to the voltage drop simulation device 1 via the communication network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A voltage drop simulation device configured to calculate voltage drops of a conductive body arranged on a printed circuit board to which a current is to be supplied, the voltage drop simulation device comprising:
   a memory; and
   a processor coupled to the memory and the processor configured to:
   divide the conductive body into a plurality of meshes including at least one mesh having a size which is different from a size of other meshes,
   calculate voltage values of a plurality of measurement points set in the plurality of meshes, respectively, and
   calculate a voltage drop of each of the plurality of meshes by dividing, for each of the plurality of meshes treated as a target mesh of which the voltage drop is to be calculated, a difference between a voltage value of a first measurement point included in the target mesh and a voltage value of a second measurement point included in an adjacent mesh that is adjacent to the target mesh by a distance between the first measurement point and the second measurement point,
   wherein the first measurement point and the second measurement point are included in the plurality of measurement points, and
   wherein the calculation of the voltage drop of each of the plurality of meshes is provided for subsequent design and manufacturing of the printed circuit board.

2. The voltage drop simulation device according to claim 1,
   wherein, when a plurality of adjacent meshes are adjacent to the target mesh, the processor
   calculates a plurality of voltage drops between the first measurement point included in the target mesh and each of a plurality of second measurement points included in the plurality of adjacent meshes by dividing differences between the voltage value of the first measurement point and voltage values of the plurality of second measurement points included in the plurality of adjacent meshes by distances between the first measurement point and the plurality of second measurement points included in the plurality of adjacent meshes, respectively, and
   treats a maximum value among the plurality of voltage drops as a voltage drop of the target mesh.

3. The voltage drop simulation device according to claim 1,
   wherein the processor
   calculates a voltage drop of the target mesh by dividing a difference between the voltage value of the first measurement point included in the target mesh and a voltage value of a third measurement point included in a mesh connected to the target mesh through a via by a layer thickness between a layer in which the first measurement point is located and a layer in which the third measurement point is located.

4. The voltage drop simulation device according to claim 1,
   wherein the processor
   displays the target mesh with a color corresponding to the voltage drop of the target mesh.

5. A voltage drop simulation method for calculating voltage drops of a conductive body arranged on a printed circuit board to which a current is to be supplied, the voltage drop simulation method comprising:
   dividing the conductive body into a plurality of meshes including at least one mesh having a size which is different from a size of the other meshes;
   calculating voltage values of a plurality of measurement points set in the plurality of meshes, respectively; and
   calculating a voltage drop of each of the plurality of meshes by dividing, for each of the plurality of meshes treated as a target mesh of which the voltage drop is to be calculated, a difference between a voltage value of a first measurement point included in the target mesh and a voltage value of a second measurement point included in an adjacent mesh that is adjacent to the target mesh by a distance between the first measurement point and the second measurement point, by a processor,
   wherein the first measurement point and the second measurement point are included in the plurality of measurement points, and
   wherein the calculating of the voltage drop of each of the plurality of meshes is provided for subsequent design and manufacturing of the printed circuit board.

6. The voltage drop simulation method according to claim 5,
   wherein, when a plurality of adjacent meshes are adjacent to the target mesh, the processor
   calculates a plurality of voltage drops between the first measurement point included in the target mesh and each of a plurality of second measurement points included in the plurality of adjacent meshes by dividing differences between the voltage value of the first measurement point and voltage values of the plurality of second measurement points included in the plurality of adjacent meshes by distances between the first measurement point and the plurality of second measurement points included in the plurality of adjacent meshes, respectively, and
   treats a maximum value among the plurality of voltage drops as a voltage drop of the target mesh.

7. The voltage drop simulation method according to claim 5,
   wherein the processor
   calculates a voltage drop of the target mesh by dividing a difference between the voltage value of the first measurement point included in the target mesh and a voltage value of a third measurement point included in a mesh connected to the target mesh through a via by a layer thickness between a layer in which the first measurement point is located and a layer in which the third measurement point is located.

8. The voltage drop simulation method according to claim 5,
wherein the processor
displays the target mesh with a color corresponding to the voltage drop of the target mesh.

9. A computer-readable non-transitory recording medium storing a program to calculate voltage drops of a conductive body arranged on a printed circuit board to which a current is to be supplied, the program causing a computer to execute a procedure, the procedure comprising:
dividing the conductive body into a plurality of meshes including at least one mesh having a size which is different from a size of other meshes;
calculating voltage values of a plurality of measurement points set in the plurality of meshes, respectively; and
calculating a voltage drop of each of the plurality of meshes by dividing, for each of the plurality of meshes treated as a target mesh of which the voltage drop is to be calculated, a difference between a voltage value of a first measurement point included in the target mesh and a voltage value of a second measurement point included in an adjacent mesh that is adjacent to the target mesh by a distance between the first measurement point and the second measurement point,
wherein the first measurement point and the second measurement point are included in the plurality of measurement points, and
wherein the calculating of the voltage drop of each of the plurality of meshes is provided for subsequent design and manufacturing of the printed circuit board.

10. The computer-readable non-transitory recording medium according to claim 9,
wherein, when a plurality of adjacent meshes are adjacent to the target mesh, the procedure includes:
calculating a plurality of voltage drops between the first measurement point included in the target mesh and each of a plurality of second measurement points included in the plurality of adjacent meshes by dividing differences between the voltage value of the first measurement point and voltage values of the plurality of second measurement points included in the plurality of adjacent meshes by distances between the first measurement point and the plurality of second measurement points included in the plurality of adjacent meshes, respectively, and
treating a maximum value among the plurality of voltage drops as a voltage drop of the target mesh.

11. The computer-readable non-transitory recording medium according to claim 9,
wherein the procedure includes:
calculating a voltage drop of the target mesh by dividing a difference between the voltage value of the first measurement point included in the target mesh and a voltage value of a third measurement point included in a mesh connected to the target mesh through a via by a layer thickness between a layer in which the first measurement point is located and a layer in which the third measurement point is located.

12. The computer-readable non-transitory recording medium according to claim 9,
wherein the procedure includes:
displays the target mesh with a color corresponding to the voltage drop of the target mesh.

13. The voltage drop simulation device according to claim 1, wherein in response to the calculation of the voltage drops of the meshes of the conductive body satisfying the voltage drop simulation, providing the calculated voltage drops of the conductive body for the subsequent design and manufacturing of the printed circuit board.

14. The voltage drop simulation method according to claim 5, wherein in response to the calculating of the voltage drops of the meshes of the conductive body satisfying the voltage drop simulation, providing the calculated voltage drops of the conductive body for the subsequent design and manufacturing of the printed circuit board.

15. The computer-readable non-transitory recording medium according to claim 9, wherein in response to the calculating of the voltage drops of the meshes of the conductive body satisfying the voltage drop simulation, providing the calculated voltage drops of the conductive body for the subsequent design and manufacturing of the printed circuit board.

* * * * *